US008917345B2

(12) United States Patent
Jang (10) Patent No.: US 8,917,345 B2
(45) Date of Patent: Dec. 23, 2014

(54) MULTI-DISPLAY DIGITAL IMAGE PROCESSING APPARATUS USING EXTERNAL DISPLAY APPARATUS FOR SIMULTANEOUS DISPLAY OF SLIDE SHOW AT DIFFERENT SPEEDS, WITH RELATED METHOD AND COMPUTER READABLE RECORDING MEDIUM

(71) Applicant: Samsung Electronics Co., Ltd., Suwon-si (KR)

(72) Inventor: Sung-kyu Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/152,223

(22) Filed: Jan. 10, 2014

(65) Prior Publication Data

US 2014/0125555 A1 May 8, 2014

Related U.S. Application Data

(62) Division of application No. 13/783,693, filed on Mar. 4, 2013, now abandoned, which is a division of application No. 12/750,185, filed on Mar. 30, 2010, now abandoned.

(30) Foreign Application Priority Data

May 13, 2009 (KR) ........................ 10-2009-0041748

(51) Int. Cl.
| | |
|---|---|
| *H04N 5/225* | (2006.01) |
| *H04N 5/222* | (2006.01) |
| *G06F 3/00* | (2006.01) |
| *H04N 1/00* | (2006.01) |
| *G06F 3/14* | (2006.01) |
| *H04N 5/232* | (2006.01) |
| *G09G 5/00* | (2006.01) |
| *H04N 5/262* | (2006.01) |
| *H04N 101/00* | (2006.01) |

(52) U.S. Cl.
CPC .............. *G06F 3/14* (2013.01); *H04N 1/00453* (2013.01); *H04N 1/00291* (2013.01); *H04N 5/23216* (2013.01); *G09G 5/003* (2013.01); *H04N 2201/001* (2013.01); *H04N 2101/00* (2013.01); *H04N 2201/0084* (2013.01); *H04N 5/2621* (2013.01)
USPC .................... 348/333.12; 348/207.1; 715/730

(58) Field of Classification Search
USPC .............. 348/207.1, 333.05, 333.11, 333.12; 715/730, 732
See application file for complete search history.

(56) References Cited

U.S. PATENT DOCUMENTS

| 7,176,848 B1 * | 2/2007 | Dai et al. ....................... 345/2.2 |
| 2004/0090391 A1 | 5/2004 | Kondo |

(Continued)

FOREIGN PATENT DOCUMENTS

| CN | 1500345 A | 5/2004 |
| CN | 1617577 A | 5/2005 |

(Continued)

OTHER PUBLICATIONS

Office Action issued for CN No. 2010-10154518.2, Dec. 4, 2013.

(Continued)

*Primary Examiner* — John Villecco
(74) *Attorney, Agent, or Firm* — Drinker Biddle & Reath LLP (57) ABSTRACT

An apparatus that supports multi-display to reproduce images on an external display apparatus connectable to the apparatus, a method of operating the apparatus, and a computer readable recording medium recorded thereon a program for executing the method. The apparatus includes: a digital signal processor which, when a signal of a first display command is input to the apparatus, displays a screen obtained by performing the first display command on the apparatus in a continuous reproduction mode at a predetermined speed, and when a signal of a second display command corresponding to the signal of the first display command is input to the apparatus, displays a screen obtained by performing the second display command on the external display apparatus images on the external display apparatus at a speed different from the predetermined speed of the continuous reproduction mode.

13 Claims, 10 Drawing Sheets

(56) References Cited

U.S. PATENT DOCUMENTS

| | | |
|---|---|---|
| 2005/0046727 A1 | 3/2005 | Nozaki et al. |
| 2005/0099518 A1 | 5/2005 | Mihara et al. |
| 2005/0110909 A1 | 5/2005 | Staunton et al. |
| 2005/0190280 A1* | 9/2005 | Haas et al. ............... 348/333.05 |
| 2005/0253774 A1 | 11/2005 | Choi |
| 2006/0034042 A1 | 2/2006 | Hisano et al. |
| 2006/0034043 A1 | 2/2006 | Hisano et al. |
| 2006/0187331 A1* | 8/2006 | Watanabe et al. ........ 348/333.01 |
| 2006/0268121 A1* | 11/2006 | Watanabe .................. 348/231.2 |
| 2007/0279512 A1* | 12/2007 | Maruyama et al. ...... 348/333.11 |
| 2009/0096713 A1 | 4/2009 | Kim et al. |

FOREIGN PATENT DOCUMENTS

| | | | |
|---|---|---|---|
| CN | 1647508 A | | 7/2005 |
| CN | 1734392 A | | 2/2006 |
| CN | 1734410 A | | 2/2006 |
| CN | 1961282 A | | 5/2007 |
| CN | 101408868 A | | 4/2009 |
| JP | 06149956 A | * | 5/1994 |
| JP | 2000341572 A | * | 12/2000 |
| JP | 2006279303 A | * | 10/2006 |
| JP | 2008042437 A | * | 2/2008 |

OTHER PUBLICATIONS

Office Action issued for CN 201010154518.2 (Aug. 12, 2014).

* cited by examiner

MULTI-DISPLAY DIGITAL IMAGE PROCESSING APPARATUS USING EXTERNAL DISPLAY APPARATUS FOR SIMULTANEOUS DISPLAY OF SLIDE SHOW AT DIFFERENT SPEEDS, WITH RELATED METHOD AND COMPUTER READABLE RECORDING MEDIUM

CROSS-REFERENCE TO RELATED PATENT APPLICATION

This application is a divisional of U.S. patent application Ser. No. 13/783,693, filed Mar. 4, 2013, which is a divisional of U.S. patent application Ser. No. 12/750,185, filed Mar. 30, 2010, which claims the benefit of Korean Patent Application No. 10-2009-0041748, filed on May 13, 2009, in the Korean Intellectual Property Office, the disclosures of which are incorporated herein in their entirety by reference.

BACKGROUND

The invention relates to digital image processing apparatus, a method of operating the digital image processing apparatus, and a computer readable recording medium having recorded thereon a program for executing the method, and more particularly, to a digital image processing apparatus which supports multi-display to reproduce images on an external display apparatus, a method of operating the digital image processing apparatus, and a computer readable recording medium having recorded thereon a program for executing the method.

A digital image processing apparatus, such as a digital camcoder including a digital camera, a cellular phone including a camera module, and a personal digital assistant (PDA), displays an image on a display unit, such as a liquid crystal display (LCD), included in the digital image processing apparatus.

When various types of external display apparatuses, such as LCD TVs, computer monitors, plasma display panels (PDPs), and projection TVs, are connected to the digital image processing apparatus, the same image displayed on the display unit of the digital image processing apparatus may be displayed on the external display apparatuses.

However, when the same image displayed on the display unit is displayed on an external display apparatus, a desire of a user wanting to use various methods of displaying an image may not be satisfied.

SUMMARY

An embodiment of the invention provides a digital image processing apparatus which supports multi-display to reproduce images on an external display apparatus, a method of operating the digital image processing apparatus, and a computer readable recording medium having recorded thereon a program for executing the method.

According to an embodiment of the invention, there is provided a digital image processing apparatus that supports multi-display to reproduce images on an external display apparatus connectable to the multi-display digital image processing apparatus, the digital image processing apparatus comprising: an input element, a display, and a digital signal processor which, when a signal of a first display command is input to the digital image processing apparatus with the input element, displays a screen obtained by performing the first display command on the digital image processing apparatus, and when a signal of a second display command corresponding to the signal of the first display command is input to the digital image processing apparatus, displays a screen obtained by performing the second display command on the external display apparatus.

The digital signal processor may include: a connection detector which detects whether the digital image processing apparatus and the external display apparatus are connected to each other; a display selector which selects one of the digital image processing apparatus and the external display apparatus to display the screens obtained by performing the first and second display commands; and a controller which performs the first and second display commands.

The first display command may display an image selected from among images stored in the digital image processing apparatus in a full screen, and the second display command may display an enlarged or reduced image of a partial area selected from the full screen on the external display apparatus.

An on-screen display (OSD) image, which displays a window on the selected partial area on the full screen, may be further displayed.

The first display command may display an image selected from among images stored in the digital image processing apparatus on the digital image processing apparatus in a full screen, and the second display command may display an image, on which a special effect is performed on the selected image, on the external display apparatus.

Options of the special effect may be displayed on the digital image processing apparatus in an on-screen display (OSD) image.

The second display command may display the selected image and the image, on which the special effect is performed, on the external display apparatus by dividing a screen of the external display apparatus.

The first display command may display images stored in the digital image processing apparatus in a continuous reproduction mode at a predetermined speed on the digital image processing apparatus, and the second display command may display the images on the external display apparatus at a speed different from the predetermined speed of the continuous reproduction mode.

According to another embodiment of the invention, there is provided a method of operating a digital image processing apparatus that supports multi-display to reproduce images on an external display apparatus connectable to the digital image processing, the method comprising: inputting a signal of a first display command to the digital image processing apparatus; inputting a signal of a second display command to the digital image processing apparatus; selecting any one of the digital image processing apparatus and the external display apparatus to display screens obtained by performing the first and second display commands; and displaying the screens obtained by performing the first and second display commands.

The selecting may include detecting whether the digital image processing apparatus and the external display apparatus are connected to each other.

The first display command may display an image selected from among images stored in the digital image processing apparatus in a full screen, and the second display command may display an enlarged or reduced image of a partial area selected from the full screen on the external display apparatus.

The first display command may further display an on-screen display (OSD) image, which displays a window around the selected partial area on the full screen.

The first display command may display an image selected from among images stored in the digital image processing apparatus on the digital image processing apparatus in a full screen, and the second display command may display an image, on which a special effect is performed on the selected image, on the external display apparatus.

The first display command may further display options of the special effect on the digital image processing apparatus in an on screen display (OSD) image.

The second display command may display the selected image and the image, on which the special effect is performed, on the external display apparatus by dividing a screen of the external display apparatus.

The first display command may display images stored in the digital image processing apparatus in a continuous reproduction mode at a predetermined speed on the digital image processing apparatus, and the second display command may display the images on the external display apparatus at a speed different from the predetermined speed of the continuous reproduction mode.

According to another embodiment of the invention, there is provided a computer program product, comprising a computer usable medium having a computer readable program code embodied therein, said computer readable program code adapted to be executed to implement the above described method for operating a digital image processing apparatus that supports multi-display to reproduce images on an external display apparatus connectable to the digital image processing.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION OF THE EMBODIMENTS

Hereinafter, the various embodiments of the invention will be described more fully with reference to the accompanying drawings, in which exemplary embodiments of the invention are shown.

Figure 1:
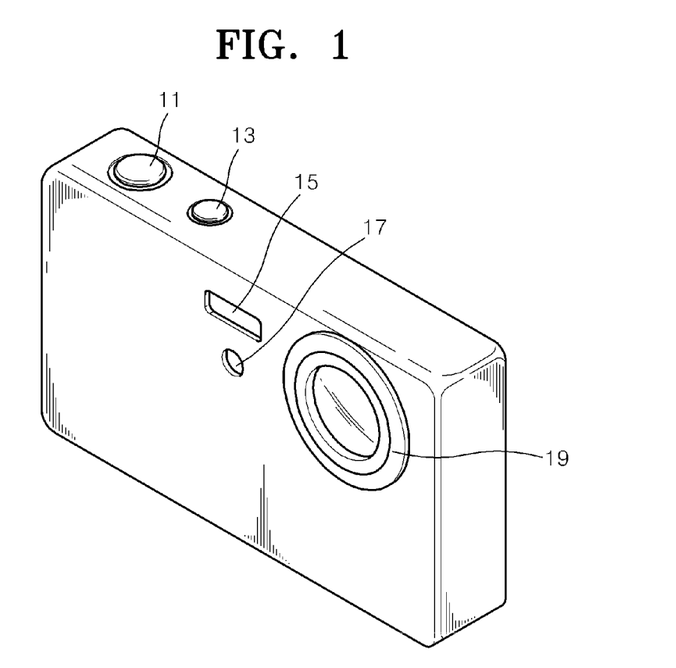
FIG. 1 is a front-top perspective view of a digital image processing apparatus.

FIG. 1 is a front and top perspective view of a digital image processor.

A shutter-release button 11 is pressed or released so as to expose a charge coupled device (CCD) or a film to light for a predetermined time, and record an image on the CCD by suitably exposing a subject in association with an iris (not shown).

A power supply button 13 can be activated to operate the digital image processor by supplying power to the digital image processor.

A flash 15 instantly illuminates with a bright light when an image is captured in a dark place, and examples of a flash mode include an automatic flash mode, a forced flash mode, a no flash mode, a red eye reduction mode, and a slow synchro mode.

An auxiliary light 17 supplies light to a subject so that the digital image processor automatically, quickly, and accurately adjusts a focus when the light intensity is insufficient or when an image is captured at night.

A lens unit 19 receives light from an external light source and processes an image.

Figure 2:
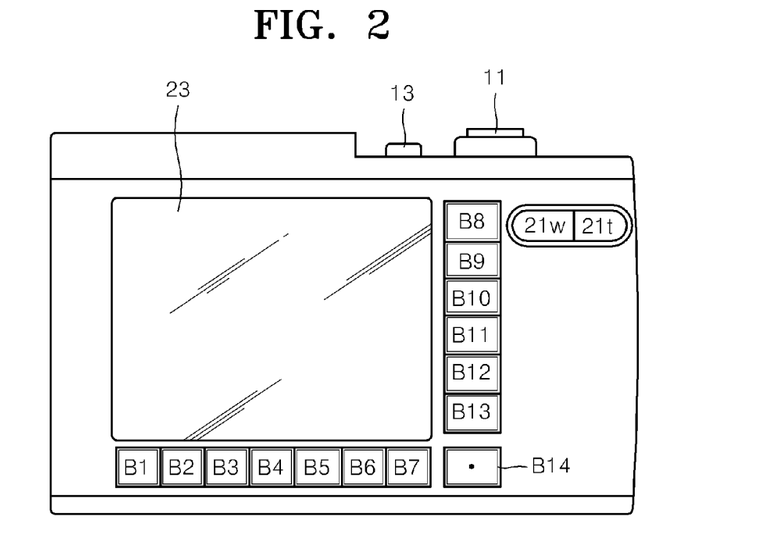
FIG. 2 is a rear view of the digital image processing apparatus of FIG. 1.

FIG. 2 is a rear view of the digital image processor of FIG. 1. The digital image processor also may include a wide angle-zoom button 21w, a telescopic-zoom button 21t, a display unit 23, and a plurality of input buttons (hereinafter, referred to as buttons) B1 through B14 including a touch sensor or a contact type switch.

A view angle is widened or narrowed according to an input of the wide angle-zoom button 21w or a telescopic-zoom button 21t. Specifically, the wide angle-zoom button 21w and a telescopic-zoom button 21t are used to change a size of a selected exposure area. When the wide angle-zoom button 21w is activated, the size of the selected exposure area is decreased, and when the telescopic-zoom button 21t is activated, the size of the selected exposure area is increased.

The buttons B1 through B14 are disposed close to sides of the display unit 23 along vertical and horizontal directions. The buttons B1 through B14 include a touch sensor (not shown) or a contact type switch (not shown). In other words, when the buttons B1 through B14 include a touch sensor, a finger of a user may move up/down/right/left while touching the buttons B1 through B7 disposed in the horizontal direction or the buttons B8 through B14 disposed in the vertical direction, so as to select a predetermined value, such as a color or brightness, from among main menu items or to activate lower menu icons included in a main menu icon. Alternatively, when the buttons B1 through B14 include a contact type switch, a desired function may be executed by directly selecting a main menu icon and a lower menu icon. The touch sensor is more touch-sensitive than the contact type switch.

Figure 3:
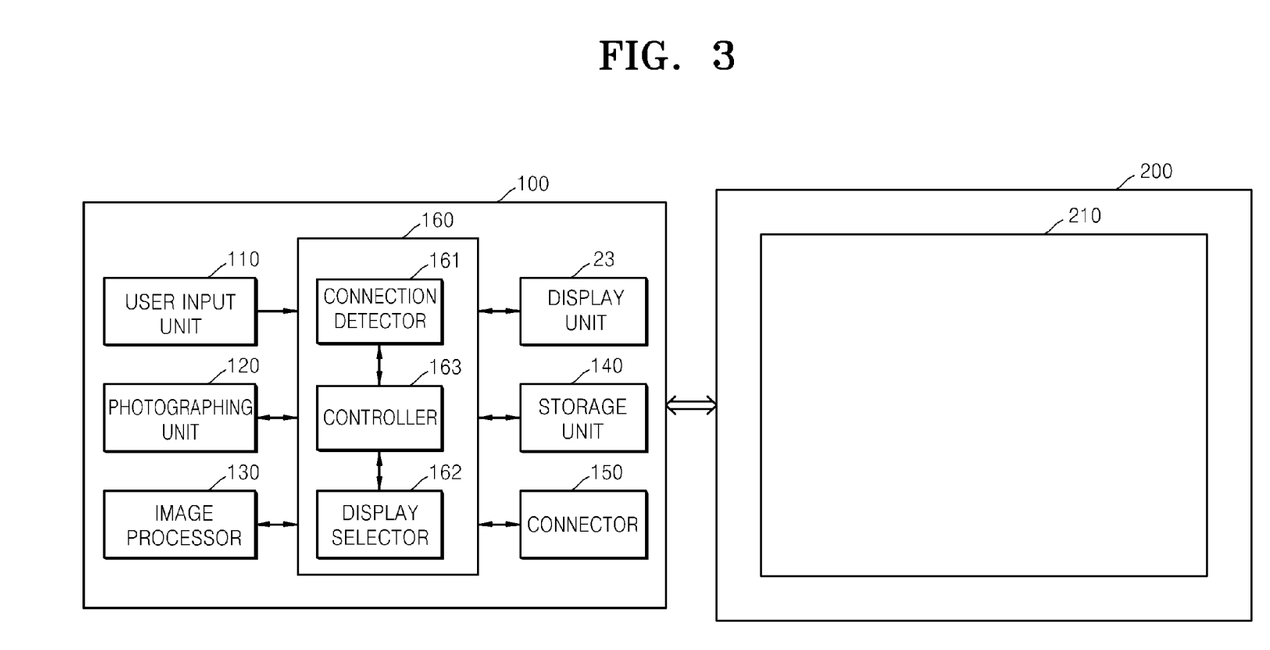
FIG. 3 is a block diagram illustrating a digital image processing apparatus which supports multi-display to reproduce images on an external display apparatus, according to an embodiment of the invention.

FIG. 3 is a block diagram illustrating a digital image processing apparatus 100 that supports multi-display to reproduce images on an external display apparatus 200, according to an embodiment of the invention. The digital image processing apparatus 100 may include a display unit 23, a user input unit 110, a photographing unit 120, an image processor 130, a storage unit 140, a connector 150, and a digital signal processor 160. In FIG. 3, the digital image processing apparatus 100 is connected to the external display apparatus 200, for example, a TV, to multi-display a predetermined image reproduced by the digital image processing apparatus 100 on the external display apparatus 200.

The user input unit 110 may include the shutter-release button 11, which is pressed or released to expose a CCD or a film to light for a predetermined time, the power supply button 13, which is activated to supply power to the digital image processing apparatus 100, the wide angle-zoom button 21w and the telescopic-zoom button 21t, which widen or narrow a view angle, and the buttons B1 through B14, which are disposed close to sides of the display unit 23 along vertical and horizontal directions and include a touch sensor or a contact type switch so as to input a character or select and execute a menu, as shown in FIG. 2.

The photographing unit 120 includes a shutter, a lens unit, an iris, a CCD, and an analog digital converter (ADC), which are not shown. The shutter and the iris adjust light intensity. The lens unit receives light from an external light source and processes an image. Here, the iris adjusts the amount of received light (light intensity) according to an opening and closing degree of the iris. The opening and closing degree of the iris is controlled by the digital signal processor 160.

The CCD accumulates the light intensity received via the lens unit, and according to the accumulated light intensity, outputs an image formed in the lens unit according to a vertical synchronization signal. The digital image processing apparatus 100 obtains an image from the CCD, which converts light reflected from a subject into an electric signal. A color filter is required to obtain a color image using the CCD, and the CCD may employ a color filter array (CFA). Only light indicating one color per pixel passes through the CFA. The CFA has a regularly arranged structure, and has various forms according to an arrangement structure. The ADC converts an analog signal output from the CCD to a digital signal.

In various exemplary embodiments, the image processor 130 signal-processes digitally converted raw data so that the raw data may be displayed on a display device. The image processor 130 removes a black level due to a dark current generated in the CCD or the CFA that is sensitive to changes of temperature. The image processor 130 performs gamma compensation, which encodes information according to the non-linearity of a visual angle of a human. The image processor 130 performs CFA interpolation, which interpolates a Bayer pattern realized in an RGRG line and a GBGB line of predetermined gamma compensated data to an RGB line. The image processor 130 converts an interpolated RGB signal into a YUV signal, performs an edge compensation that clarifies an image by filtering a Y signal with a high band pass filter, performs a color correction that corrects color values of U and V signals by using standard color coordinates, and removes noise from the Y, U, and V signals. The image processor 130 generates a Joint Photographic Experts Group (JPEG) file by compressing and signal-processing the Y, U, and V signals from which noise were removed. The generated JPEG file is displayed on the display unit 23 and stored in the storage unit 140. Various operations of the image processor 130 are controlled by the digital signal processor 160.

The storage unit 140 is a space for finally storing an image file, and may include various types of memory cards, such as a smart card, a compact flash (CF) memory, a memory stick, and a secure digital (SD) memory card. Besides the memory cards for storing an image file, the digital image processing apparatus 100 may further include an electrically erasable and programmable read only memory (EEPROM), which stores algorithms required to operate a processor of the digital image processing apparatus 100, and a flash memory, which stores setting data required to operate a processor of the digital image processing apparatus 100.

The connector 150 may include a wireless or wire interface for transmitting an image signal from the digital image processing apparatus 100 to the external display apparatus 200 under control of the digital signal processor 160. Examples of the wire interface include a universal serial bus (USB), a high definition multimedia interface (HDMI), and examples of the wireless interface include worldwide interoperability for microwave access (WiMAX), long term evolution (LTE), Wi-Fi, and Blue-tooth.

During a reproduction mode, the digital signal processor 160 detects whether the digital image processing apparatus 100 and the external display apparatus 200 are connected to each other, and when the digital image processing apparatus 100 and the external display apparatus 200 are connected to each other, displays a screen obtained by performing a second display command corresponding to a first display command input to the digital image processing apparatus 100 on a display unit 210 of the external display apparatus 200.

Accordingly, the digital signal processor 160 includes a connection detector 161, a display selector 162, and a controller 163.

The connection detector 161 detects whether the digital image processing apparatus 100 is connected to the external display apparatus 200. The connection detector 161 may output a trigger signal in the detection of a connection between the connector 150 of the digital image processing apparatus 100 and the external display apparatus 200. The connection detector 161 may be realized inside the digital signal processor 160 of the digital image processing apparatus 100, or may be realized separately from the controller 163 as hardware for detecting an external load.

The display selector 162 selects one of the digital image processing apparatus 100 and the external display apparatus 200 to display a screen obtained by performing the first or second display command.

Here, the first display command is a general display command regarding various reproduction methods that the digital image processing apparatus 100 is to perform in a reproduction mode of the digital image processing apparatus 100. For example, the first display command may include a command to display a plurality of images stored in the digital image processing apparatus 100 as thumbnail images in a thumbnail reproduction mode, a command to display one image selected in a general reproduction mode of the digital image processing apparatus 100 in a full screen, and a command to display the plurality of images stored in the digital image processing apparatus 100 in a continuous reproduction mode at a predetermined speed.

Also, the first display command may further include a command to display various on screen display (OSD) images provided by a monitor without a separate image signal. Details thereof will be described below.

The second display command is a general display command that is newly performed on a predetermined image displayed on the digital image processing apparatus 100 according to the first display command via a series of manipulations by a user. The second display command is different from and corresponds to the first display command. For example, when the first display command is to display the plurality of images stored in the digital image processing apparatus 100 as thumbnail images in the thumbnail reproduction mode, the second display command may be a command to display one thumbnail image selected by a user from among the thumbnail images in a full screen. Also, when the first display command is to display one image selected from among the plurality of images stored in the digital image processing apparatus 100 in a full screen, the second display command may be a command to display an enlarged or reduced image of a partial area selected in the full screen. Also, when the first display command is to display one image selected from among the plurality of images stored in the digital image processing apparatus 100 in a full screen, the second display command may be a command to display an image, on which a special effect is performed on the selected image, on the external display apparatus 200. Also, when the first display command is to display the plurality of images stored in the digital image processing apparatus 100 on the digital image processing apparatus 100 in a continuous reproduction mode at a predetermined speed, the second display command may be a command to display the plurality of images, which are displayed on the digital image processing apparatus 100, on the external display apparatus 200 in a continuous reproduction mode at a speed that is different from the speed of the continuous reproduction mode of the digital image processing apparatus 100.

The first and second display commands are performed under control of the controller 163. Here, the controller 163 displays a screen obtained by performing the first display command on the display unit 23 of the digital image processing apparatus 100.

When the connection detector 161 detects that the external display apparatus 200 and the digital image processing apparatus 100 are connected to each other, the display selector 162 selects the external display apparatus 200 to display a screen obtained by performing the second display command, and transmits the screen obtained by performing the second display command to the external display apparatus 200 via the connector 150.

Exemplary embodiments of the invention will now be described in detail with reference to FIGS. 4 through 11.

Figure 4:
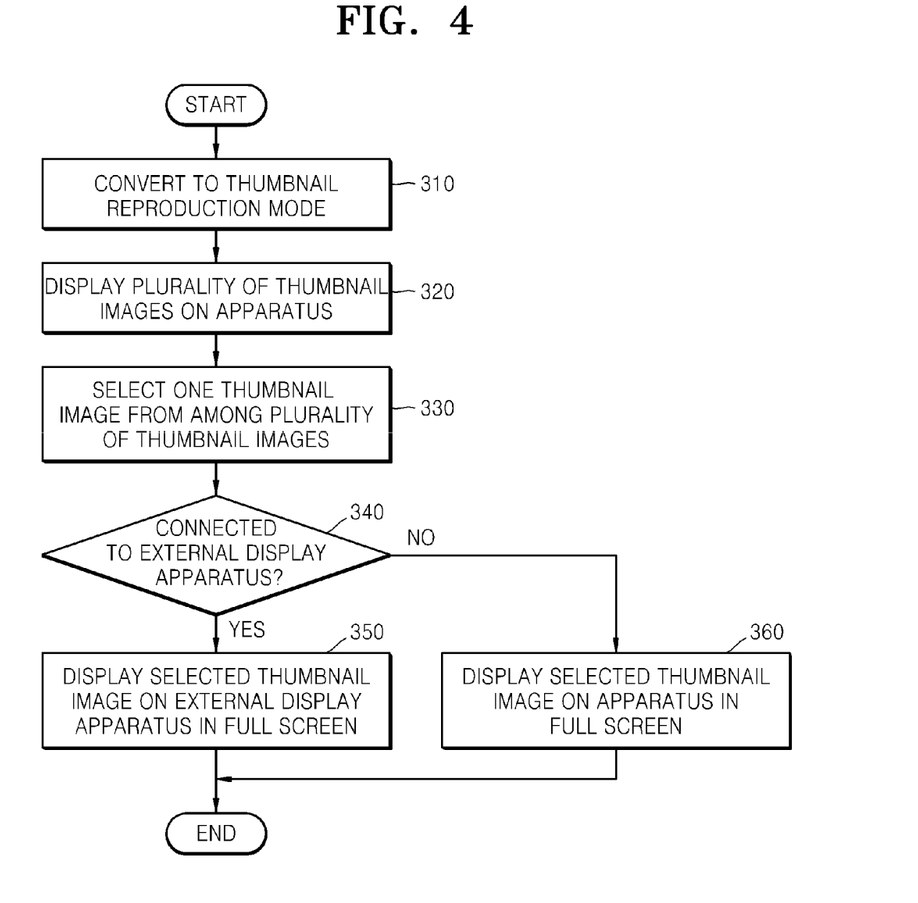
FIG. 4 is a flowchart schematically showing a method of operating the digital image processing apparatus which supports multi-display to reproduce images on the external display apparatus, according to an embodiment of the invention.
Figure 5:
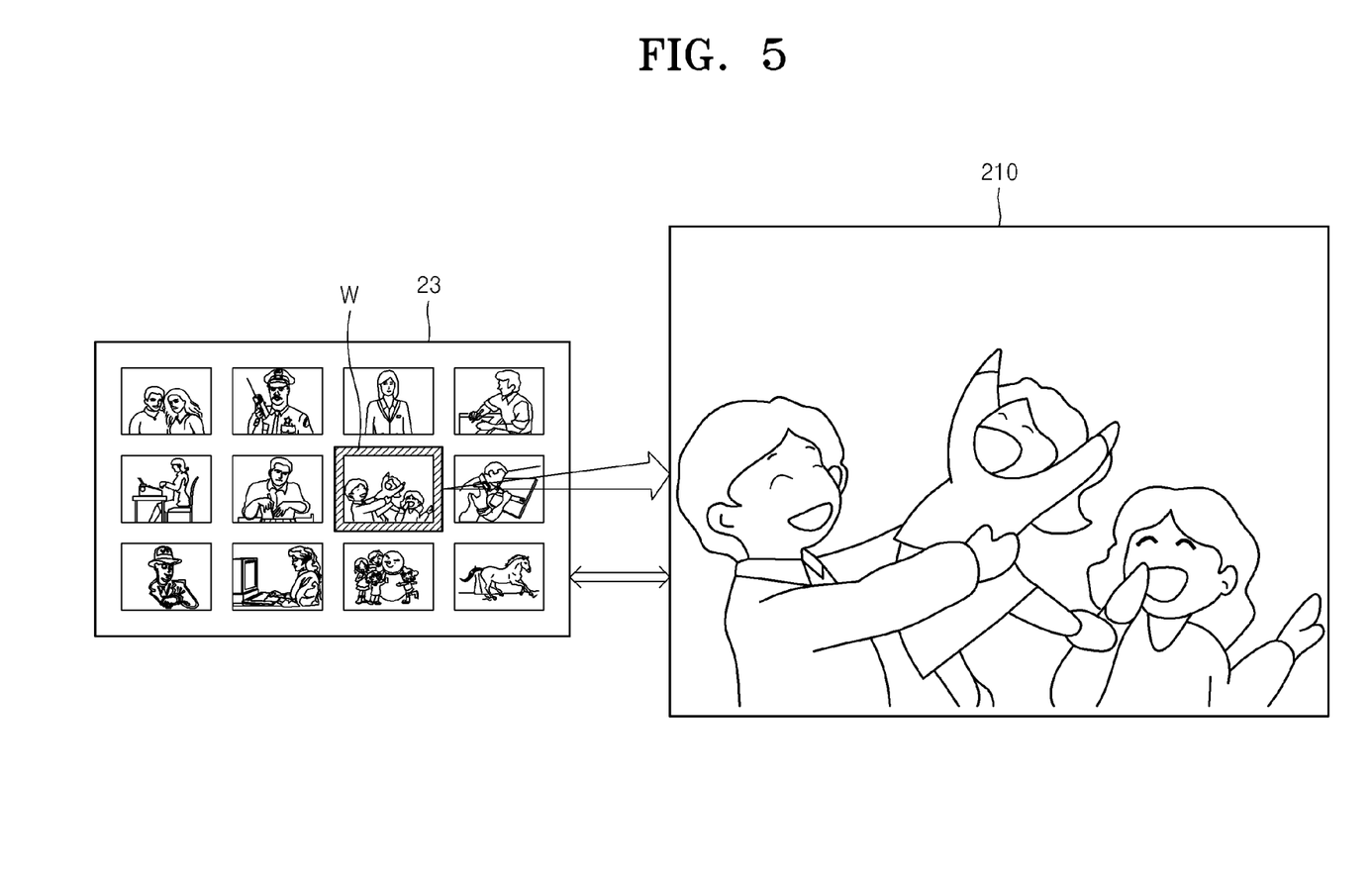
FIG. 5 is a pictorial diagram for illustrating the method of FIG. 4.

FIG. 4 is a flowchart showing a method of operating the digital image processing apparatus 100 that supports multi-display to reproduce images on the external display apparatus 200, according to an embodiment of the invention, and FIG. 5 is a pictorial diagram for describing the method. The method according to the current embodiment may be performed in the digital image processing apparatus 100. According to an embodiment, a main algorithm of the method may be performed in the digital signal processor 160 with the help of peripheral components of the digital signal processor 160.

Referring to FIGS. 4 and 5, when a thumbnail reproduction mode signal, which is a signal of a first display command, is input using, e.g., the buttons B1 through B14, the digital image processing apparatus 100 is converted to a thumbnail reproduction mode, in operation 310.

When the thumbnail reproduction mode signal is input, the controller 163 displays a screen obtained by performing the first display command, i.e., a plurality of images stored in the digital image processing apparatus 100, on the display unit 23 of the digital image processing apparatus 100 as a plurality of thumbnail images, in operation 320.

In operation 330, a user selects a desired thumbnail image from among the thumbnail images displayed on the display unit 23 of the digital image processing apparatus 100. Here, a window W with a predetermined size, which is a type of on-screen display (OSD), is displayed around an outline of the selected thumbnail image, with the selected thumbnail image. A location of the window W may be freely moved using the buttons B1 through B14 included in the user input unit 110. A signal of a second display command is input in the same manner.

In operation 340, the connection detector 161 continuously detects whether the digital image processing apparatus 100 is connected to the external display apparatus 200. Here, determining of whether the digital image processing apparatus 100 is connected to the external display apparatus 200 may operate as an interrupt.

If an interrupt does not occur in operation 340, the display selector 162 selects the digital image processing apparatus 100 to display a screen obtained by performing the second display command, and the screen obtained by performing the second display command, i.e., the selected thumbnail image, is displayed on the display unit 23 of the digital image processing apparatus 100 in a full screen, in operation 360.

Otherwise, if an interrupt occurs in operation 340, the display selector 162 selects the external display apparatus 200 to display the screen obtained by performing the second display command, and the screen obtained by performing the second display command, i.e., the selected thumbnail image, is displayed on the display unit 210 of the external display apparatus 200 in a full screen, in operation 350.

According to the current embodiment, the user is able to quickly browse a desired image while looking at a plurality of thumbnail images on the display unit 23 of the digital image processing apparatus 100, and simultaneously view a large image in high resolution on the display unit 210 of the external display apparatus 200, such as TV. Accordingly, the convenience of the user is increased.

Figure 6:
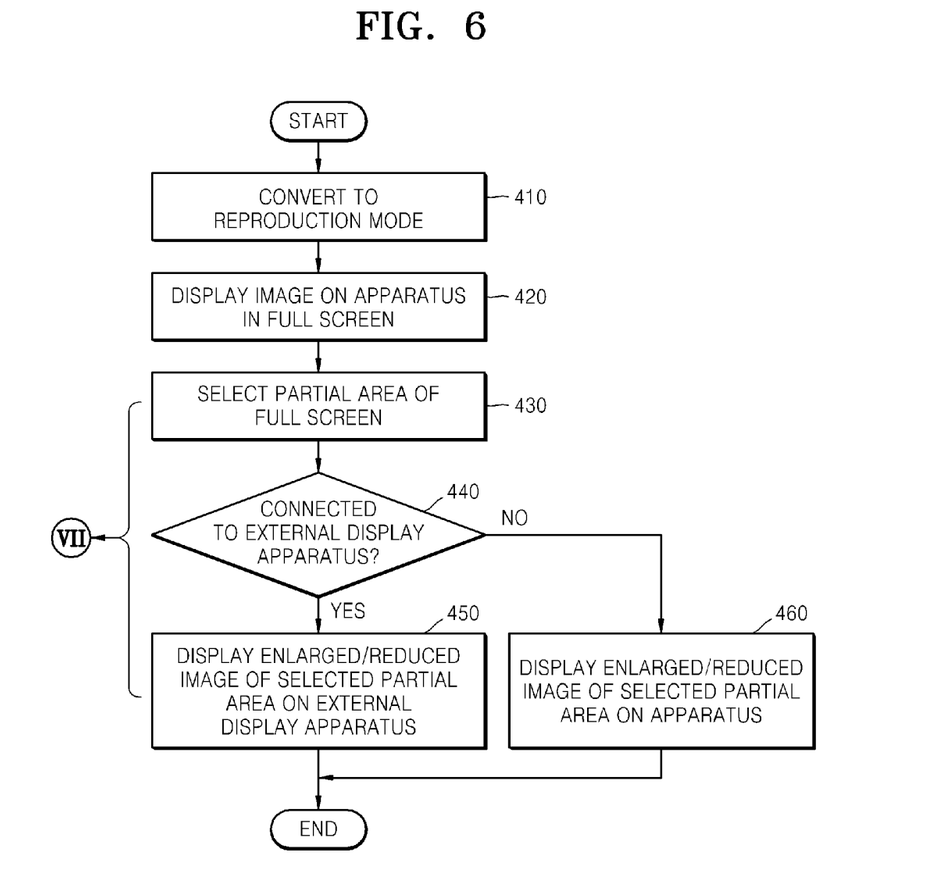
FIG. 6 is a flowchart showing a method of operating the digital image processing apparatus which supports multi-display to reproduce images on the external display apparatus, according to another embodiment of the invention.
Figure 7:
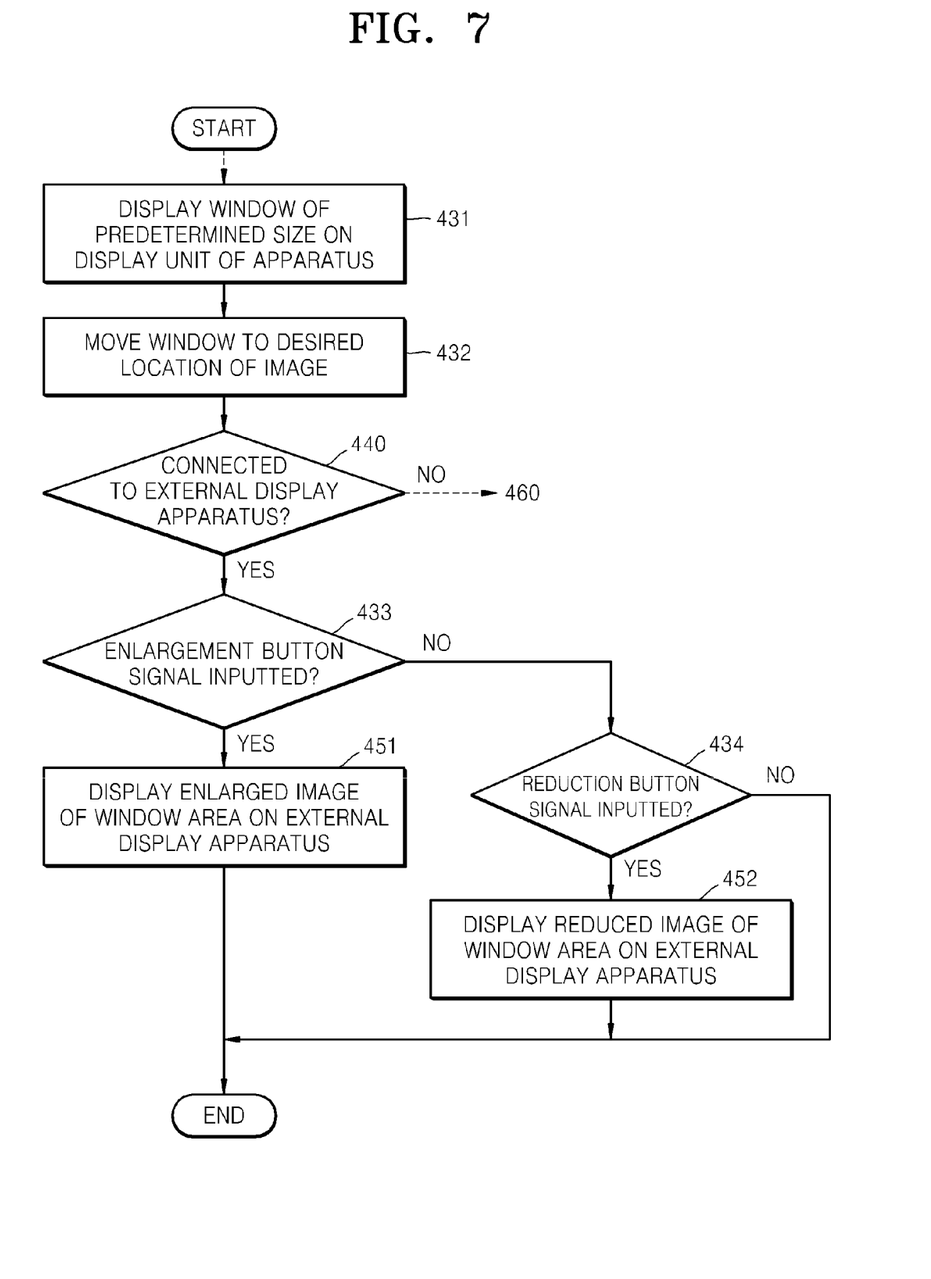
FIG. 7 is a flowchart illustrating elements VII of FIG. 5 in detail.
Figure 8:
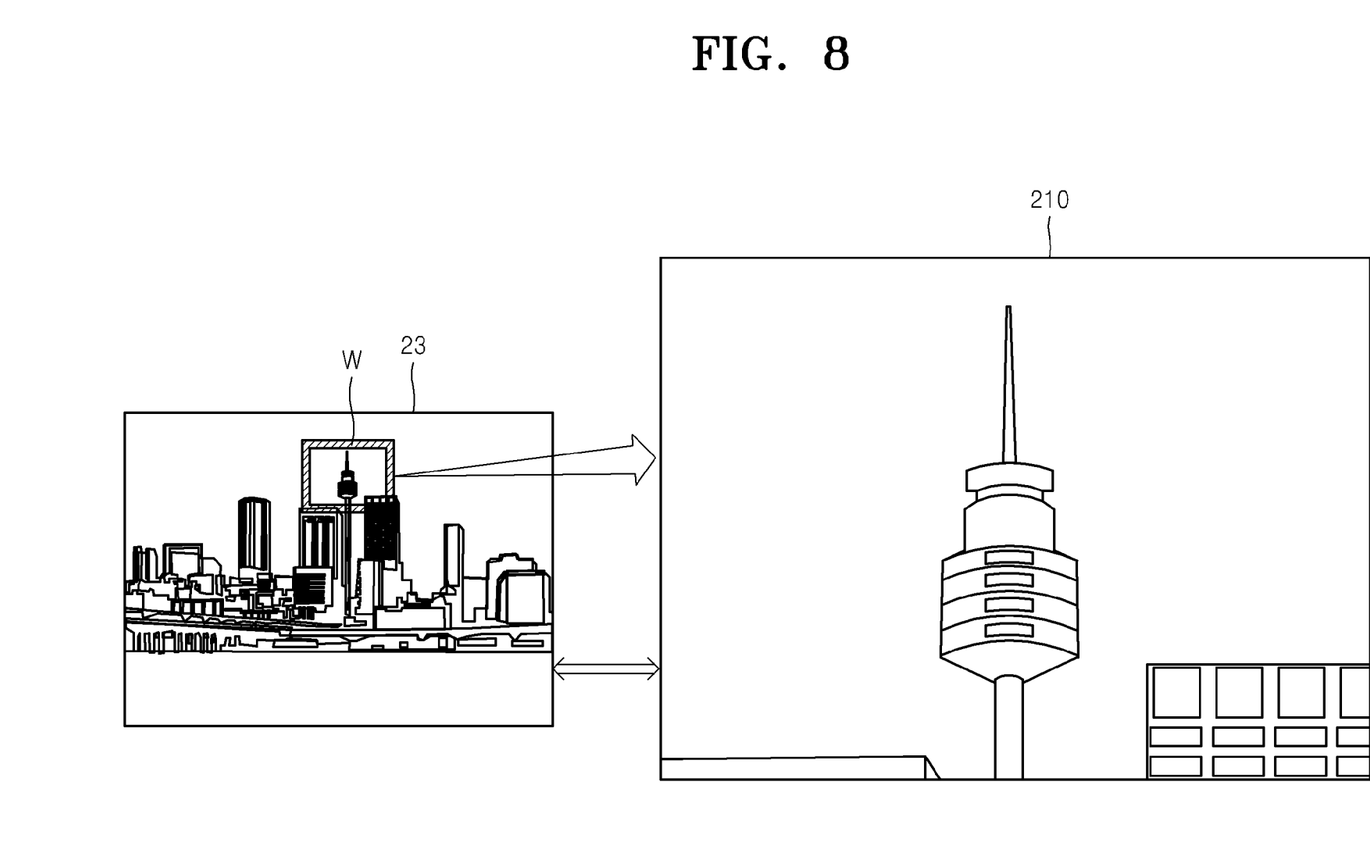
FIG. 8 is a pictorial diagram for illustrating the method of FIG. 6.

FIG. 6 is a flowchart showing a method of operating the digital image processing apparatus 100 that supports multi-display to reproduce images on the external display apparatus 200, according to another embodiment of the invention, FIG. 7 is a flowchart illustrating VII of FIG. 5 in detail, and FIG. 8 is a pictorial diagram for illustrating the method. The method according to the current embodiment may be performed in the digital image processing apparatus 100. According to an embodiment, a main algorithm of the method may be performed in the digital signal processor 160 with the help of peripheral components of the digital signal processor 160.

Referring to FIGS. 6, 7, and 8, when a reproduction mode signal, which is a signal of a first display command, is input using the buttons B1 through B14, the digital image processing apparatus 100 is converted to a reproduction mode in operation 410.

When the reproduction mode signal is input, the controller 163 displays a screen obtained by performing the first display command, i.e., an image selected from among a plurality of images stored in the digital image processing apparatus 100, on the display unit 23 of the digital image processing apparatus 100 in a full screen, in operation 420.

A user selects a desired partial area of an area of the full screen of the image displayed on the display unit 23 of the digital image processing apparatus 100, in operation 430. Here, a window W with a predetermined size, which is a type of OSD, is displayed together with the partial area, in operation 431. A location of the window may be freely moved using the buttons B1 through B14 included in the user input unit 110, in operation 432. A signal of a second display command is input in the same manner.

The connection detector 161 continuously detects whether the digital image processing apparatus 100 is connected to the external display apparatus 200 in operation 440. Here, determining of whether the digital image processing apparatus 100 is connected to the external display apparatus 200 may operate as an interrupt.

If an interrupt does not occur in operation 440, the display selector 162 selects the digital image processing apparatus 100 to display a screen obtained by performing the second display command, and displays the screen obtained by performing the second display command, i.e., an enlarged or reduced image of the selected partial area, on the display unit 23 of the digital image processing apparatus 100, in operation 460.

Otherwise, if an interrupt occurs, the display selector 162 selects the external display apparatus 200 to display the screen obtained by performing the second display command. If an enlargement button signal is input in operation 433 as the second display command, the enlarged image of the selected partial area is displayed on the display unit 210 of the external display apparatus 200 in operation 451, as illustrated in FIG. 8, and if a reduction button signal is input in operation 434 as the second display command, a reduced image of the selected partial area is displayed on the display unit 210 of the external display apparatus 200 in operation 452.

According to the current embodiment, when an enlargement/reduction operation is performed on a partial area of an image displayed on the digital image processing apparatus 100, an enlarged/reduced image of the image is displayed on the display unit 210 of the external display apparatus 200 in high resolution, whereas a location of the partial area is indicated by a window W on the digital image processing apparatus 100. Accordingly, the convenience of the user is increased, since it can be directly seen which partial area of the image is enlarged/reduced.

Figure 9:
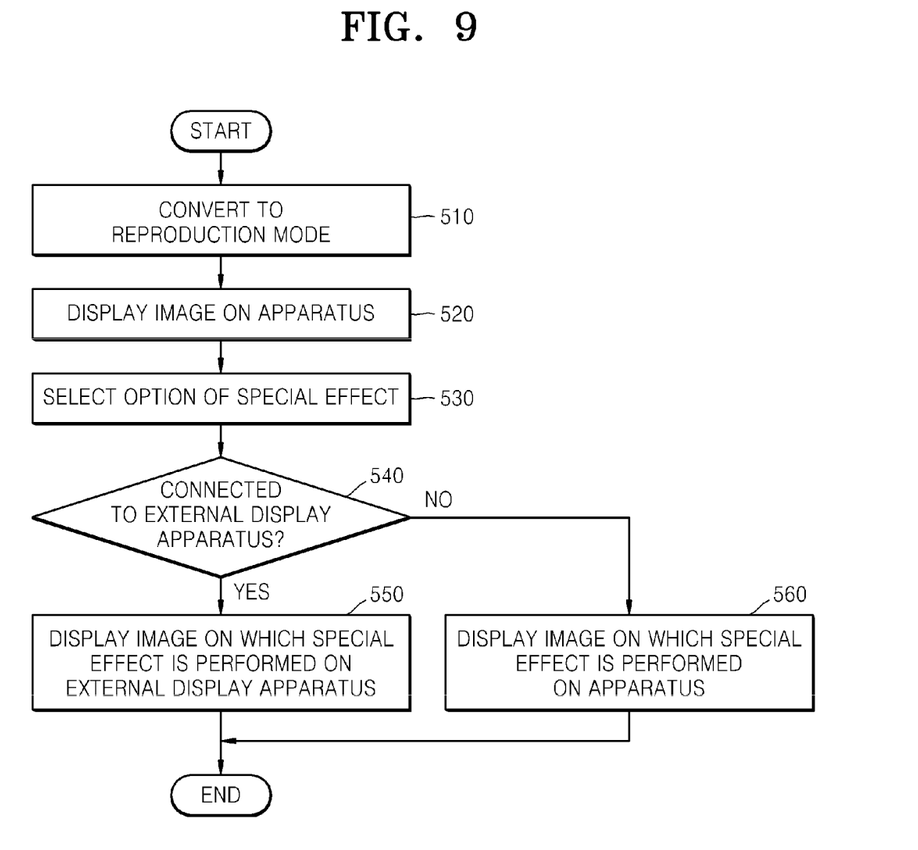
FIG. 9 is a flowchart showing a method of operating the digital image processing apparatus which supports multi-display to reproduce images on the external display apparatus, according to another embodiment of the invention.
Figure 10:
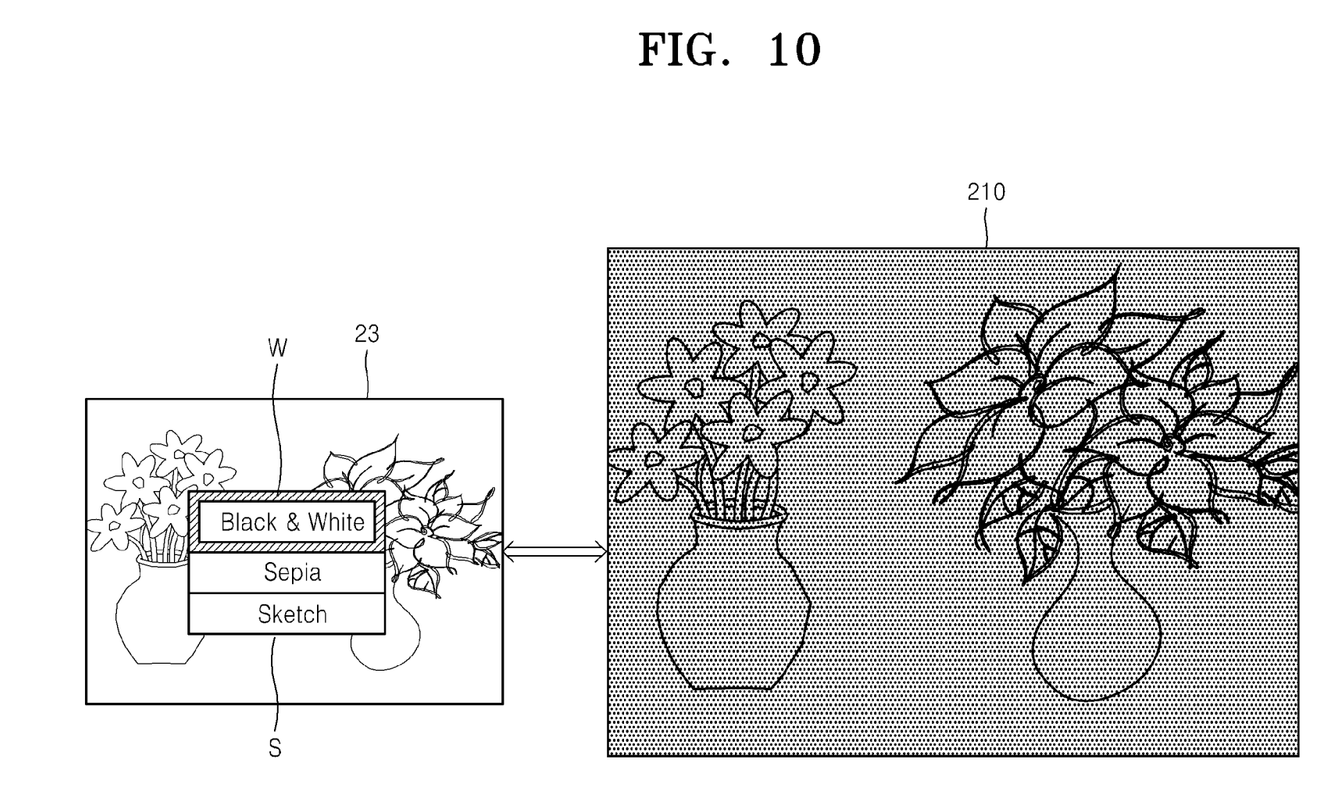
FIG. 10 is a pictorial diagram for describing the method of FIG. 9.

FIG. 9 is a flowchart schematically showing a method of operating the digital image processing apparatus 100 that supports multi-display to reproduce images on the external display apparatus 200, according to another embodiment of the invention, and FIG. 10 is a pictorial diagram for illustrating the method. The method according to the current embodiment may be performed in the digital image processing apparatus 100. According to an embodiment, a main algorithm of the method may be performed in the digital signal processor 160 with the help of peripheral components of the digital signal processor 160.

Referring to FIGS. 9 and 10, a reproduction mode signal, which is a signal of a first display command, is input using the buttons B1 through B14, the digital image processing apparatus 100 is converted to a reproduction mode in operation 510.

When the reproduction mode signal is input, the controller 163 displays a screen obtained by performing the first display command, i.e., an image selected from among plurality of images stored in the digital image processing apparatus 100, on the display unit 23 of the digital image processing apparatus 100 in a full screen, in operation 520.

Here, a type of OSD image S, which indicates options of a special effect, is simultaneously displayed on the display unit 23 of the digital image processing apparatus 100, and a user selects a desired option from among the options displayed on the display unit 23, in operation 530. Here, a window W with a predetermined size, indicating the selected option, is displayed on the OSD image S. A signal of a second display command is input in the same manner.

The connection detector 161 continuously detects whether the digital image processing apparatus 100 is connected to the external display apparatus 200 in operation 540. Here, detecting of whether the digital image processing apparatus 100 is connected to the external display apparatus 200 may operate as an interrupt.

If an interrupt does not occur in operation 540, the display selector 162 selects the digital image processing apparatus 100 to display a screen obtained by performing the second display command, and the screen obtained by performing the second display command, i.e., a screen on which the selected option of the special effect is performed, on the display unit 23 of the digital image processing apparatus 100, in operation 560.

Otherwise, if an interrupt occurs, the display selector 162 selects the external display apparatus 200 to display the screen obtained by performing the second display command, and the screen obtained by performing the second display command, i.e., the screen on which the selected option of the special effect is performed, on the display unit 210 of the external display apparatus 200, in operation 550. Here, a screen of the display unit 210 may be divided so as to display a screen before a special effect and a screen after a special effect together.

According to the current embodiment, the user is able to view an original image on the display unit 23 of the digital image processing apparatus 100, while viewing a large image, on which a special effect is performed, in high resolution on the display unit 210 of the external display apparatus 200, such as TV, and thus the convenience of the user is increased.

Figure 11:
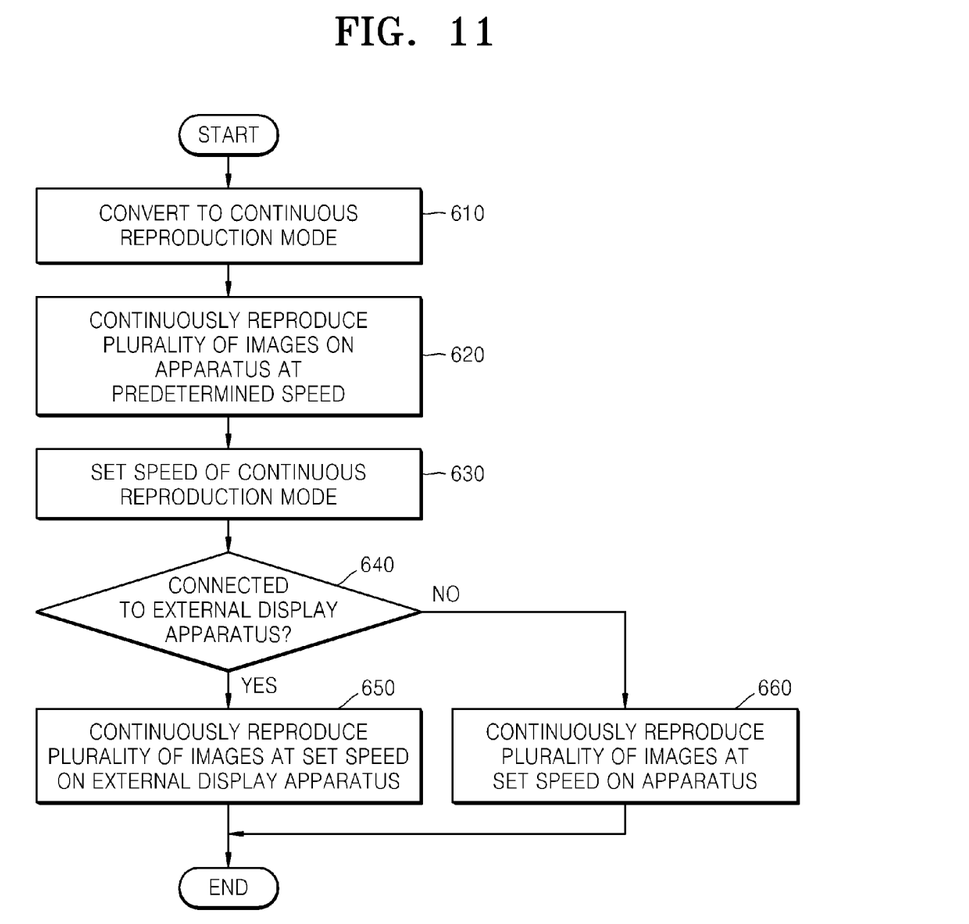
FIG. 11 is a flowchart schematically showing a method of operating the digital image processing apparatus which supports multi-display to reproduce images on the external display apparatus, according to another embodiment of the invention.

FIG. 11 is a flowchart showing a method of operating the digital image processing apparatus 100 that supports multi-display to reproduce images on the external display apparatus 200, according to another embodiment of the invention. The method according to the current embodiment may be performed in the digital image processing apparatus 100. According to an embodiment, a main algorithm of the method may be performed in the digital signal processor 160 with the help of peripheral components of the digital signal processor 160.

Referring to FIG. 11, when a continuous reproduction mode signal, which is a signal of a first display command, is input using the buttons B1 through B14, the digital image processing apparatus 100 is converted to a continuous reproduction mode in operation 610.

When the continuous reproduction mode signal is input, the controller 163 displays a screen obtained by performing the first display command, i.e., predetermined images from among a plurality of images stored in the digital image processing apparatus 100, on the display unit 23 of the digital image processing apparatus 100 at a predetermined speed in operation 620.

A user may select a speed of the continuous reproduction mode in operation 630.

The connection detector 161 continuously detects whether the digital image processing apparatus 100 is connected to the external display apparatus 200 in operation 640. Here, detecting of whether the digital image processing apparatus 100 is connected to the external display apparatus 200 may operate as an interrupt.

If an interrupt does not occur in operation 640, the display selector 162 selects the digital image processing apparatus 100 to display a screen obtained by performing a second display command, and the screen obtained by performing the second display command, i.e., the predetermined images having a newly set speed that is faster or slower than the predetermined speed of the continuous reproduction mode of the digital image processing apparatus 100, on the display unit 23 of the digital image processing apparatus 100, in operation 660.

Otherwise if an interrupt occurs in operation 540, the display selector 162 selects the external display apparatus 200 to display the screen obtained by performing the second display command, and the screen obtained by performing the second display command, i.e., the predetermined images having a newly set speed that is faster or slower than the predetermined speed of the continuous reproduction mode of the digital image processing apparatus 100, on the display unit 210 of the external display apparatus 200, in operation 650.

According to the current embodiment, the user is able to view images at an original speed of a continuous reproduction mode on the display unit 23 of the digital image processing apparatus 100, while viewing the images at a newly set speed in a large size and high resolution on the display unit 210 of the external display apparatus 200, such as TV. Accordingly, the convenience of the user is increased.

According to an apparatus and a method of operating the apparatus described above, the apparatus and an external display apparatus are simultaneously used to each display different images, and thus the apparatus and the external display apparatus are efficiently used.

The invention can also be applied in a computer readable recording medium having recorded thereon a program for executing the method of operating the apparatus that supports multi-display to reproduce images on the external display apparatus. Examples of the computer readable recording medium include magnetic storage media such as read-only memory (ROM), floppy disks, hard disks, and magnetic tapes, optical recording media such as CD-ROMs and DVDs, and storage media (e.g., transmission through the Internet).

The embodiments of the invention may be realized as media including computer readable code, thereby distributed and read by a plurality of computer systems connected via a network. Also, functional programs, codes, and code segments for accomplishing the invention can be easily construed by programmers of ordinary skill in the art to which the invention pertains.

The system described herein can include functional programs, codes, and code segments. Any of the computing elements may comprise a processor, a memory for storing program data and executing it, a permanent storage such as a disk drive, a communications port for handling communications with external devices, and user interface devices, including a display, keyboard, etc.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. An apparatus that supports multi-display to reproduce images on an external display apparatus connectable to the multi-display apparatus, the apparatus comprising:
   an input element;
   a display; and
   a digital signal processor which:
      when a signal of a first display command is input to the apparatus with the input element, displays a screen on the display obtained by performing the first display command on the apparatus; and
      when a signal of a second display command corresponding to the signal of the first display command is input to the apparatus, displays a screen obtained by performing the second display command on the external display apparatus.
   wherein, simultaneously:
      the first display command displays images stored in the apparatus in a continuous reproduction mode at a predetermined speed on the apparatus; and the second display command displays the images on the external display apparatus at a speed different from the predetermined speed of the continuous reproduction mode.

2. The apparatus of claim 1, wherein the digital signal processor comprises:
- a connection detector which detects whether the apparatus and the external display apparatus are connected to each other;
- a display selector which selects one of the apparatus and the external display apparatus to display the screens obtained by performing the first and second display commands; and
- a controller which performs the first and second display commands.

3. The apparatus of claim 2, wherein the connection detector operates as an interrupt.

4. The apparatus of claim 3, wherein:
- if an interrupt does not occur, the display selector selects the apparatus to display the screen obtained by performing the second display command; and
- if an interrupt occurs, the display selector selects the external display apparatus to display the screen obtained by performing the second display command.

5. The apparatus of claim 1, wherein the predetermined speed is user-selectable.

6. The apparatus of claim 1, wherein the images on the external display apparatus are at a larger size and higher resolution than those images on the display of the apparatus.

7. A method of operating an apparatus that supports multi-display to reproduce images on an external display apparatus connectable to the apparatus, the method comprising:
- inputting a signal of a first display command to the apparatus;
- inputting a signal of a second display command to the apparatus;
- selecting any one of the apparatus and the external display apparatus to display screens obtained by performing the first and second display commands;
- simultaneously displaying:
  - the screens obtained by performing the first and second display commands;
  - by the first display command, images stored in the apparatus in a continuous reproduction mode at a predetermined speed on the apparatus; and
  - by the second display command, images on the external display apparatus at a speed different from the predetermined speed of the continuous reproduction mode.

8. The method of claim 7, wherein the selecting comprises detecting whether the apparatus and the external display apparatus are connected to each other.

9. The method of claim 8, wherein the detecting constitutes executing and handling an interrupt when the apparatus and the external display apparatus are connected to each other.

10. The method of claim 9, wherein:
- if an interrupt does not occur, selecting the apparatus to display the screen obtained by performing the second display command; and
- if an interrupt occurs, selecting the external display apparatus to display the screen obtained by performing the second display command.

11. The apparatus of claim 7, wherein the predetermined speed is user-selectable.

12. The apparatus of claim 7, wherein the images on the external display apparatus are at a larger size and higher resolution than those images on the display of the apparatus.

13. A computer program product, comprising a non-transitory computer usable medium having a computer readable program code embodied therein, said computer readable program code adapted to be executed to implement a method for operating an apparatus that supports multi-display to reproduce images on an external display apparatus connectable to the apparatus, the method comprising:
- inputting a signal of a first display command to the apparatus;
- inputting a signal of a second display command to the apparatus;
- selecting any one of the apparatus and the external display apparatus to display screens obtained by performing the first and second display commands;
- simultaneously displaying:
  - the screens obtained by performing the first and second display commands;
  - by the first display command, images stored in the apparatus in a continuous reproduction mode at a predetermined speed on the apparatus; and
  - by the second display command, images on the external display apparatus at a speed different from the predetermined speed of the continuous reproduction mode.

\* \* \* \* \*